Feb. 26, 1946.  R. F. THORNTON  2,395,769
VEHICLE CONSTRUCTION
Filed Feb. 1, 1943  4 Sheets—Sheet 1

INVENTOR
Ray F. Thornton
BY Harness, Dickey & Pierce
ATTORNEYS

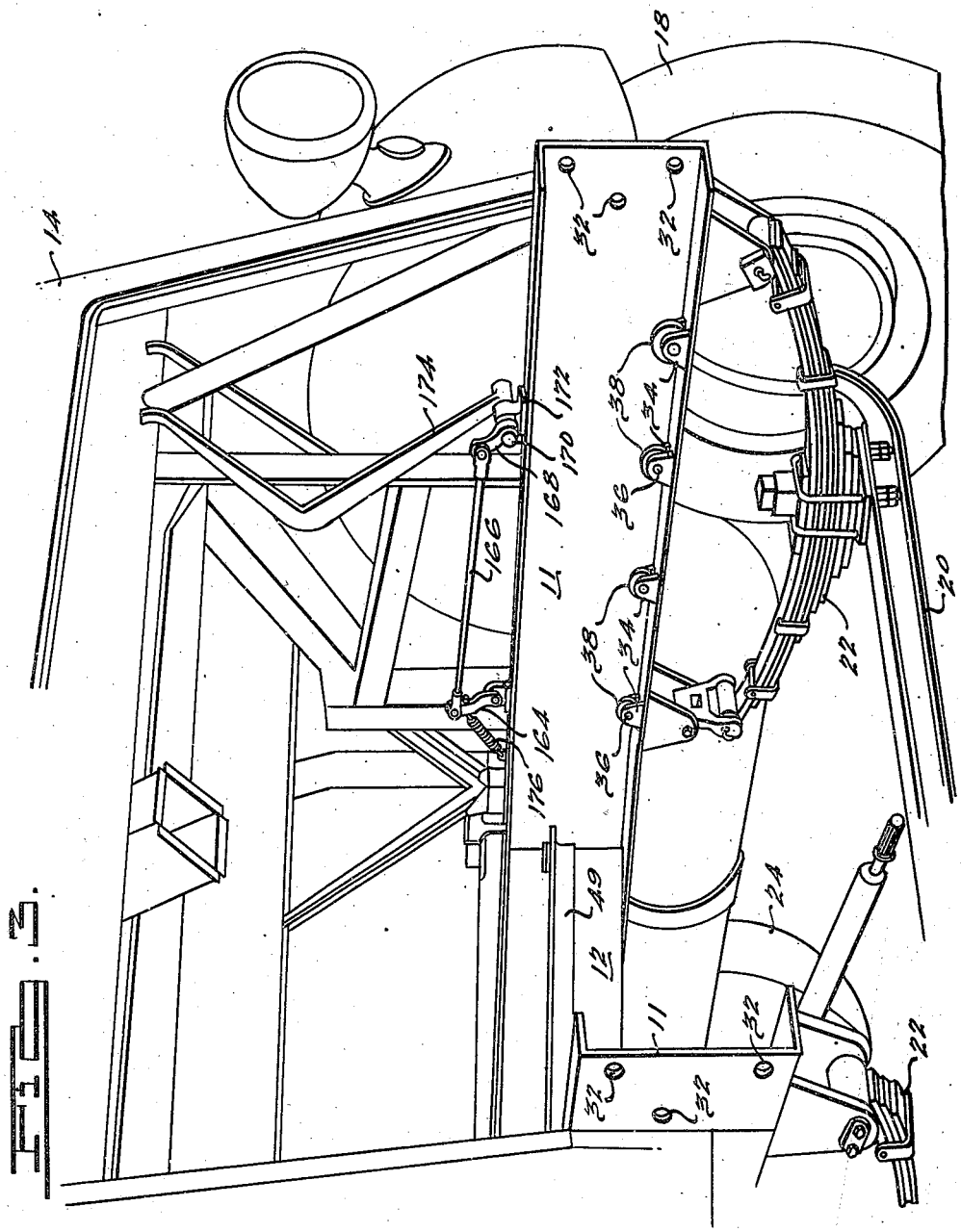

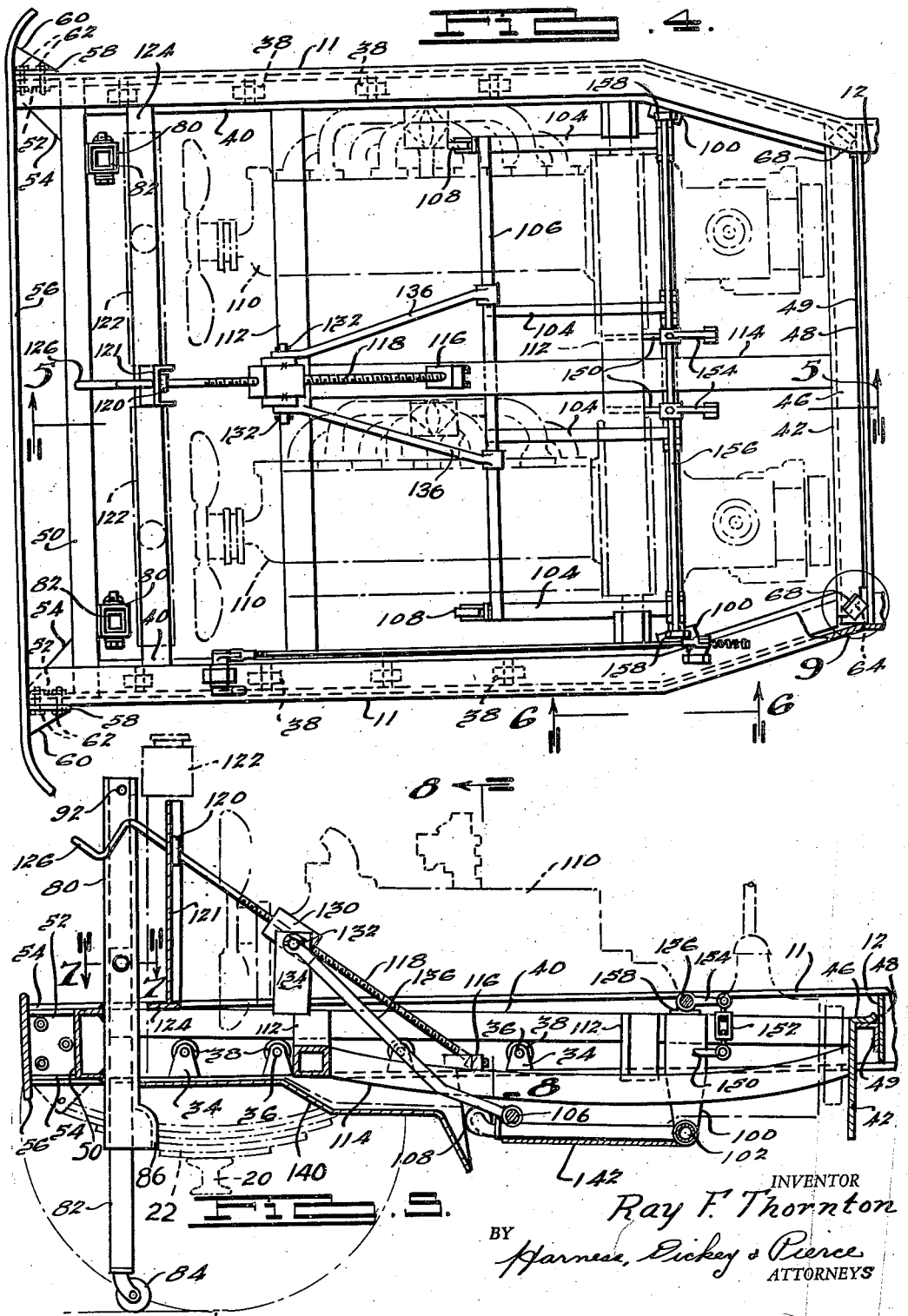

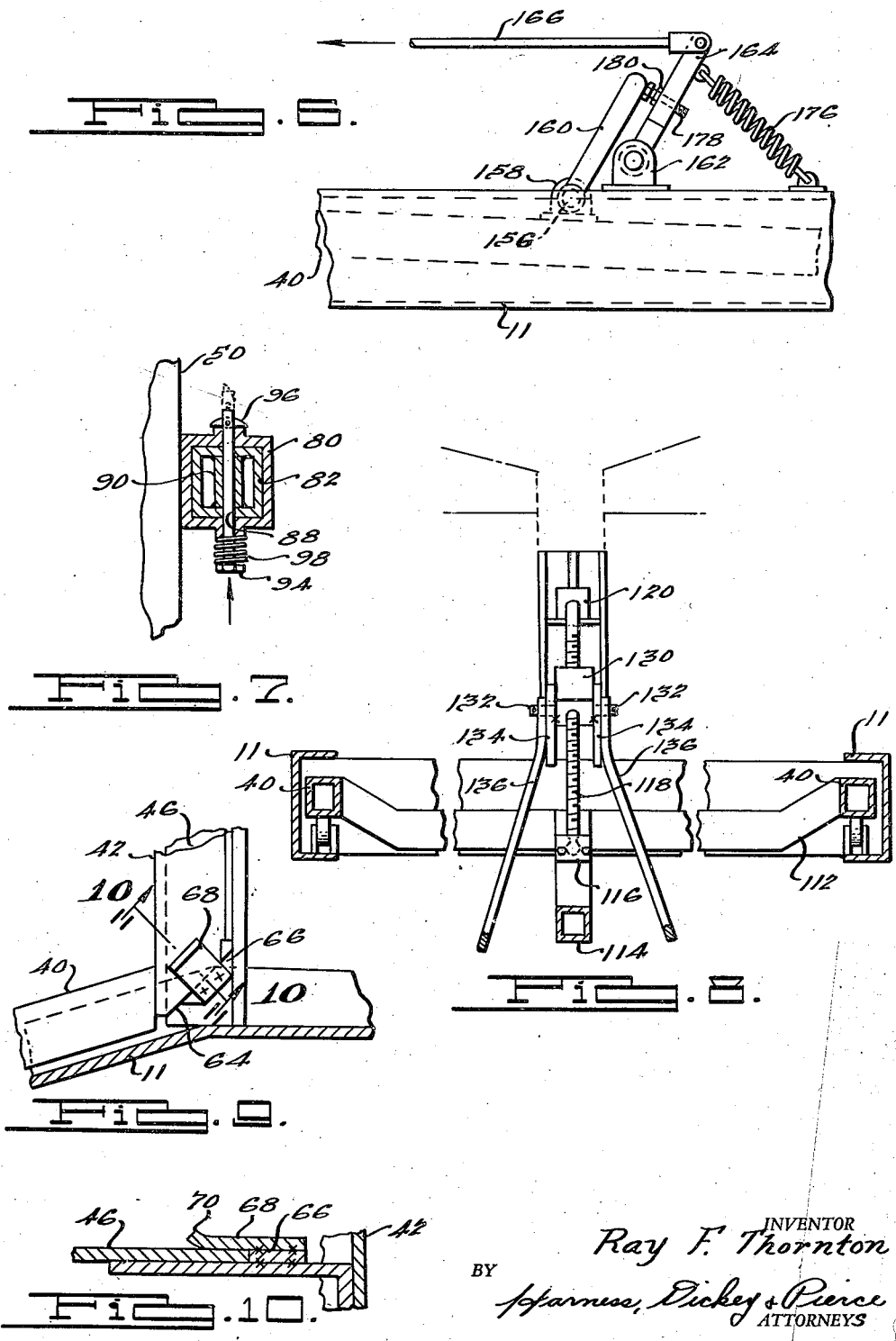

Patented Feb. 26, 1946

2,395,769

UNITED STATES PATENT OFFICE 2,395,769

VEHICLE CONSTRUCTION

Ray F. Thornton, Dearborn, Mich.

Application February 1, 1943, Serial No. 474,249

6 Claims. (Cl. 180—64)

This invention relates to motor vehicles and particularly to those types thereof in which the engine or engines and certain parts associated therewith, such as cooling radiators, are mounted upon a sub-frame so as to form a unit which is applicable and removable as such to and from the vehicle, the principal object being the provision of a structure of the type described that is relatively simple in construction, efficient in operation, and in which a minimum amount of labor is involved in applying or removing such unit to or from the vehicle.

Objects of the invention include the provision of a motor vehicle in which the power plant is mounted upon an auxiliary frame structure which is slidably associated with the frame of the vehicle, and in which a novel form of leg structure is associated with the auxiliary frame for supporting it after removal from the vehicle; the provision of a construction as above described in which supporting legs are pivotally connected to the auxiliary frame and screw means are provided for moving the legs between operative and inoperative position; the provision of a construction as above described in which the legs constitute the rear legs for the auxiliary frame and the screw means is operable from the front end thereof; the provision of a construction as above described in which such legs include a mud pan section which is automatically positioned in operative relation with respect to the power plant of the vehicle when such legs are moved to their inoperative position; and the provision of a construction as above described in which the supporting legs are firmly braced in their operative position.

Other objects of the invention include the provision of a novel front supporting leg structure for a vehicle of the type described; the provision of a construction of a vehicle of the type described having its power plant supported upon an auxiliary frame slidably associated with the main frame of the vehicle and removable therefrom including vertically disposed tubes at the forward end of the auxiliary frame and auxiliary front legs vertically slidably associated with such tubes; the provision of a construction as above described together with a novel form of means for securing the legs in their operative and inoperative position; and the provision of a construction as above described that permits the front supporting legs to be operatively positioned relative to the ground before the removable power plant unit is disconnected from the vehicle frame.

Further objects of the invention include the provision of a vehicle having a power plant unit mounted on an auxiliary frame slidably associated with the main frame for application and removal to and from the same, including a bumper structure and a novel form of construction whereby common means are employed for securing both the bumper structure and the auxiliary frame in position relative to the vehicle frame.

Still further objects of the invention include the provision of a vehicle of the general type above described in which a novel form of connection is provided between the clutch operating pedal and the clutch of the power plant wherein the pedal is permanently mounted with respect to the frame of the vehicle and removal of the power plant unit automatically disconnects the clutch pedal from the clutch; the provision of a construction as above described including interengageable parts automatically operatively associated with one another upon positioning of the power plant unit in its operative position with respect to the vehicle frame; and the provision of a construction as above described in which means are provided for adjusting the position of the clutch pedal independently of adjustment of the clutch itself.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a side elevational view of a truck-tractor embodying a removable engine unit in accordance with the present invention;

Fig. 3 is an enlarged fragmentary perspective view showing the front end of the truck-tractor illustrated in Fig. 1 after the power plant unit shown in Fig. 2 has been removed therefrom;

Fig. 4 is a fragmentary plan view of the forward end of the main frame of the truck-tractor shown in Fig. 1 with the auxiliary power plant supporting frame in operative relation with respect thereto;

Fig. 5 is a vertical sectional view of that portion of the structure shown in Fig. 4 and taken as on the line 5—5 thereof;

Fig. 6 is an enlarged fragmentary side elevational view taken in the direction of the arrows 6—6 of Fig. 4 and illustrating the form of connection employed between the clutch pedal and the clutch operating shaft;

Fig. 7 is an enlarged horizontal sectional view taken on the line 7—7 of Fig. 5 and illustrating the means employed for securing the front supporting legs in either their operative or inoperative position;

Fig. 8 is a fragmentary, vertical sectional view taken on the line 8—8 of Fig. 5 and illustrating the construction of the rear leg raising and lowering mechanism;

Fig. 9 is an enlarged partially broken, partially sectioned plan view of that portion of the structure shown in Fig. 4 within the circle 9, showing in greater detail the means employed for locating the rear end of the removable engine unit transversely with respect to the vehicle frame; and Fig. 10 is an enlarged fragmentary, vertical sectional view taken on the line 10—10 of Fig. 9.

Figure 1:
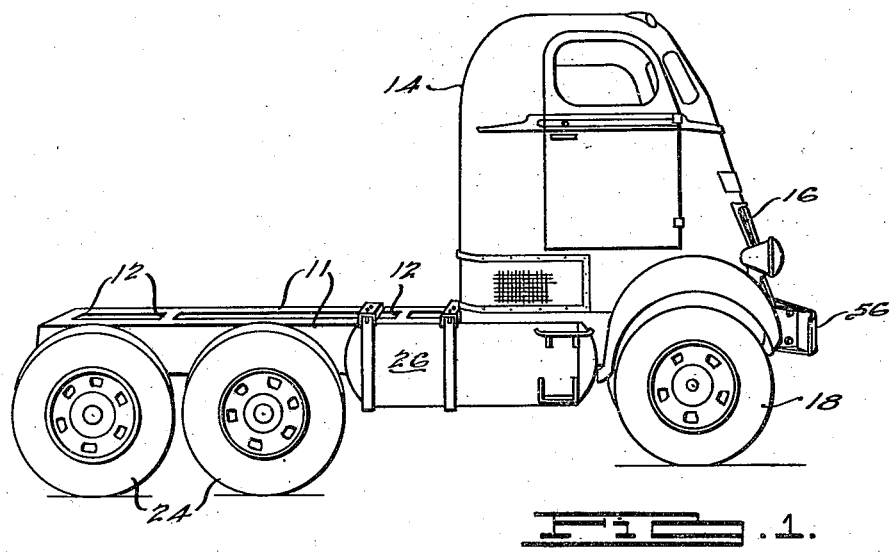

The present invention relates to that type of motor vehicle structure in which the engine or engines employed for driving the vehicle, the radiators where employed, and certain other auxiliary parts of the vehicle are formed into a unit which is applicable to and removable from the vehicle as such in order to simplify particularly the servicing of such engine and parts. It is of the same general character as the structure shown and described in my copending application for Letters Patent of the United States for improvements in Vehicle construction, filed December 28, 1942, and serially numbered 470,349 (which matured into Patent No. 2,378,810, June 19, 1945), but involves certain definite improvements over the structure there shown and described.

The present invention is applicable for use in vehicles of the type described whether the engine is mounted at the front of the vehicle or at the rear thereof, the former construction being shown by way of illustration. In its broader sense the invention is equally applicable for use in such vehicles whether the vehicle is equipped with one engine or two engines but inasmuch as a more limited phase of the present invention deals with the construction of such units where two engines are employed, a vehicle equipped with two of such engines is shown in the drawings by way of illustration. It will also be appreciated that the invention is applicable to motor vehicles regardless of the type and/or intended use, it being shown as applied to a vehicle of the truck-tractor type in the accompanying drawings for the purpose of simplicity in showing only.

Referring now to the accompanying drawings and particularly to Fig. 1, the vehicle there shown, as above described, is of the so-called truck-tractor type including a relatively short frame having side members 11 and a plurality of cross-members 12 rigidly and permanently fixed thereto, the forward of such permanent cross-members 12 being spaced a material distance rearwardly of the forward end of the frame side members 11 as particularly brought out in Fig. 3. As in the case of many of such so-called truck-tractors the cab 14 which is positioned at the front end of the frame is of the so-called "over the engine" type and in the particular case shown it is provided with a front grille 16 which is conveniently removable when it is desired to remove or replace the power plant unit. At its forward end the frame is supported by a pair of steering wheels indicated generally at 18 which, as best brought out in Fig. 3, are carried at the opposite ends of a conventional front axle 20 connected to the frame side members 10 by means of conventional semi-elliptic leaf springs 22. In the particular vehicle shown and as indicated in Fig. 1 tandem axles (not seen) support the rear end of the vehicle and are provided with wheels indicated generally at 24. A fuel tank such as 26 may be conveniently mounted on the side of the frame of the vehicle as shown.

As perhaps best brought out in Fig. 3 the frame side members 10 are of conventional channel section and relatively deep with the channels of the opposite members facing each other in accordance with conventional practice and arranged in parallel relation particularly over the forward portions thereof. As previously mentioned and as indicated in Fig. 3 no permanent cross-members interconnect the side members 10 over the forward portion of the frame where the power plant is received and the forward end of each frame side member 10 is provided with a plurality of bolt receiving holes or openings 32 through the web thereof. As also best brought out in Fig. 3 the lower flange of each frame side member within the length thereof which receives the power plant unit has secured thereto a plurality, shown as four, upwardly extending bifurcated brackets 34 in spaced relation with respect to each other longitudinally of the corresponding frame side member 11 and each bracket 34 is provided with a pin 36 extending between the opposite legs thereof adjacent the upper end thereof and on each pin 36 is rotatably mounted a roller 38, preferably through the use of anti-friction bearings. The auxiliary frame forming a part of the power plant unit is adapted to ride upon the rollers 38 as shown in Fig. 5 and as will hereinafter be more specifically brought out.

Figure 2:
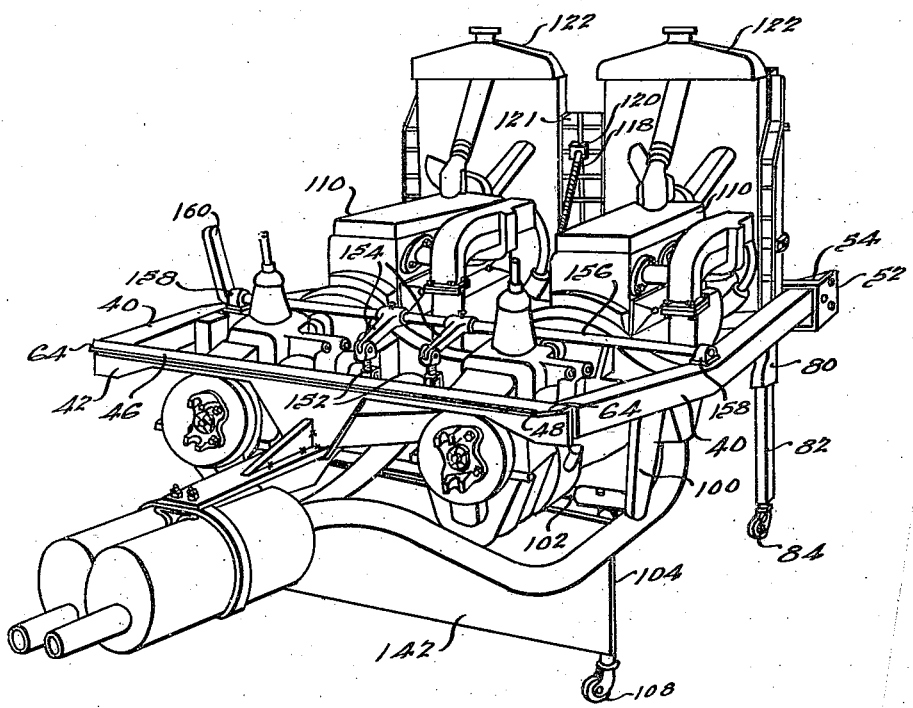
Fig. 2 is an enlarged rear quarter perspective view of the power plant unit as it appears when removed from the vehicle illustrated in Fig. 1.

As best brought out in Figs. 2, 4 and 5 the auxiliary power plant includes a pair of preferably rectangularly sectioned and preferably tubular side members 40 of a length slightly less than the distance between the front permanent cross-member 12 and the forward end of the frame side member 10. These side members 40 are parallel over the greater portion of their length and are angled inwardly at their inner ends into more or less complementary relationship with the inwardly angled portions of the frame side members 11 adjacent the rear end of the power plant receiving portion of the frame, as best brought out in Figs. 2 and 4. The side members 40 lie partially housed within the corresponding main frame side members 11 and are permanently connected across their rear ends by a cross-member 42 having a rearwardly directed flange 46 at its upper end, the extreme rear edge portion of the latter being upwardly curved as at 48 as best brought out in Fig. 5 except at the extreme end portions thereof as will hereinafter be more fully explained.

As best brought out in Fig. 5 the front cross-member 12 of the vehicle frame is of plate-like character disposed with the plane of its thickness vertical and extending horizontally across its forward face approximately midway between its upper and lower edges is an angle 49 secured thereto with one leg thereof in flat contacting relation with respect to the forward face of the plate member and the remaining leg projecting forwardly therefrom. As also brought out in Fig. 5 the position of the cross-member 42 is such that when the auxiliary frame is in assembled relation with respect to the main frame the flange 46 overlies and rests upon the upper leg of the angle iron 49 and thereby serves as a means for supporting the weight of the rear end of the auxiliary frame and parts carried thereby on the main frame. The upturned edge 48 serves to guide the flange 46 upwardly onto the angle 49 during the final movement of the power plant unit into the main frame as will be readily appreciated.

As best brought out in Figs. 4 and 5 the side members 40 are permanently connected at their front ends by means of a rearwardly opening channel sectioned cross-member 50 of slightly less depth than the depth of the main frame side members 11 so that its opposite ends may be relatively closely but slidably received between the upper and lower flanges of the latter. The length of the cross-member 50 is such as to also be relatively closely but slidably received between the webs of the opposite main frame side members 11. A forwardly directed flange member 52 arranged with its plane of thickness vertical is permanently secured by welding or the like to the forward face of the cross-member 50 at each end thereof and in flush relationship with respect to said end so as to be closely but slidably received within the channel of the corresponding main frame side member 11. The flanges 52 are braced at their upper and lower edges to the cross-member 50 by gusset plates 54 suitably fixed thereto as by welding or the like. The flange members 52 are provided with openings therein which are alignable with the openings 32 in the webs of the main frame side members 11 at the front end of the latter and as shown in Fig. 3, when the the auxiliary frame is located in its rearmost operative position in the main frame.

As also best brought out in Figs. 4 and 5 a bumper 56 is extended across the forward ends of the main frame and side members 11 and project laterally beyond the same in accordance with conventional practice. Adjacent each end thereof the bumper 56 is provided with a rearwardly directed flange 58 suitably secured thereto by welding, riveting, or the like and arranged with the plane of its thickness vertical. The flanges 58 are each braced to the bumper 56 by upper and lower gusset plates 60 similar to the gusset plates 54. The flanges 58 are spaced from each other longitudinally of the bumper 56 by a distance corresponding to the distance between the outside faces of the main frame side members 11 at the forward ends thereof so as to be relatively closely but slidably receivable by such ends. The flanges 58, like the flanges 52, are provided with openings therethrough corresponding to and alignable with the openings 32 in the main frame side members 11 when the bumper 56 is properly mounted upon the forward ends of the main frame side members 11. Bolts 62 projecting through the openings in the flanges 52 and 58 and through the openings 32 in the main frame side members 11 serve to secure the forward end of the auxiliary frame both laterally and longitudinally in the main frame and simultaneously serve to locate and support the bumper 56 in proper position upon the forward end of the main frame. Suitable nuts cooperate with the bolts 62 in a conventional manner to releasably secure the bolts in position. The bolts 62 constitute the only means which must be disconnected, outside of the propeller shaft drive, gasoline lines, and electrical connections to the engine or engines mounted in the auxiliary frame, in order to remove the auxiliary power plant from the vehicle.

The rear end of the auxiliary frame is located and fixed against movement with respect to the main frame of the vehicle in substantially the same manner as disclosed in my copending application above identified. In other words and as best brought out in Figs. 2 and 4 the rear corners of the flange 46 for the rear cross-member 42 are cut off at an angle with respect to the length and width thereof as indicated at 64. Then as best brought out in Figs. 9 and 10 a triangular plate 66 of substantially the same or slightly greater thickness as the flange 46 is secured as by welding or the like to the upper face of the angle 49 with one side thereof arranged in complementary relationship with respect to the beveled corners 64 of the flange 46 of the cross-member 42 and in position to receive such angled ends 64 when the auxiliary frame is fully positioned in the main frame of the vehicle. The plates 66 thus cooperate to form a wedge-like socket in which the wedge-like ends of the rear cross-member 42 of the auxiliary frame is operatively positioned in the main frame and thus serves to both locate the inner end of the auxiliary frame centrally of the main frame and prevents lateral shifting movement thereof during operation.

Additionally, and as best brought out in Figs. 9 and 10 a plate 68 is suitably secured to the upper face of each plate member 66 and extends forwardly and laterally inwardly therebeyond so as to overlie the flange 46 of the rear cross-member 42 when the latter is in operative relation with respect to the plate 66. The plates 68 thus serve to prevent any relative vertical movement between the rear end of the auxiliary frame and the frame of the vehicle during operation. Preferably the forward edge of the plates 68 are upwardly turned as at 70 to facilitate the entry of the flange 46 of the rear cross-member 42 thereinto when the auxiliary frame is being moved to its final position in the main frame of the vehicle.

It will be appreciated that the rollers 38 are so positioned that the under-faces of the auxiliary frame side members 40 ride upon them when the auxiliary frame is being removed from or applied to the main frame, the rollers 38 preferably being arranged at such height as to support the auxiliary frame during its passage thereover at substantially or very slightly below the final assembled position in the main frame. In other words, the rollers 38 may or may not serve to aid in supporting the auxiliary frame in the main frame in the final assembled position of the former, depending upon the vertical position of the rollers. It might be noted at this point that in view of the fact the rollers 38 ride upon the lower face of the auxiliary frame side members 40, the side member 40 in and of themselves serve as a means for shielding the contacting surfaces between the rollers and the auxiliary frame against the accumulation of mud and other foreign material which would otherwise occur in event the tracks for the rollers faced upwardly instead of downwardly as in the present case. The track surface for the auxiliary frame on the rollers is, therefore, maintained substantially free of accumulations of foreign material at all times which contributes to the ease of removing and replacing the auxiliary power plant.

It is common practice in removable power plant units of this general type of provide supporting legs to support the unit at substantially the same distance above the floor or ground, when removed from the main frame, as when supported by the main frame. Swingable front legs are of a disadvantage in that they cannot be swung to vertical position when removing a power plant unit until the unit has been moved outwardly with respect to the vehicle frame a sufficient distance to permit their free ends to clear the front axle. In my copending patent application above referred to the front legs were not permanently mounted on the front frame for the power plant unit but were separate therefrom and were bolted to the front end of the auxiliary frame after the auxiliary frame had been disconnected from the main frame and moved a slight distance outwardly therefrom. I have found it of advantage to make the front legs a permanent part of the auxiliary frame unit and, further, to form and support them in such a manner that they may be lowered to their operative position before the auxiliary frame is disconnected from the main frame in any respect.

The last feature above-mentioned is accomplished in accordance with this phase of the invention as perhaps best brought out in Figs. 2, 4, 5 and 7 by rigidly fixing to the front cross-member 50 adjacent each end thereof but within the corresponding frame side member 40 a vertically directed tubular post 80 which projects a material distance above the cross-member 50 and a short distance below it. The posts 80 may be of any suitable cross-sectional configuration but are preferably square as shown. Within each post 80 a leg member 82 is vertically slidably received in relatively closely fitting relation. The bottom end of each leg member 82 is provided with a caster 84 for actual contact with the ground or other supporting surface. Each leg member 82 is of substantially the same length as its corresponding post 80. The bottom end of each post 80 is preferably bulged out as at 86 in Fig. 5 to form an internal pocket in which the caster 84 may be received when the leg is in its raised position.

In order to lock each leg 82 in either its operative or inoperative position the construction best shown in Figs. 5 and 7 is employed. Each leg 82 adjacent its upper end is provided with a transverse opening 88 centrally therewith as brought out in Fig. 7 and the leg is preferably provided with a spring collar 90 internally thereof in alignment with the opening 88 and bridging the opposite side walls of the leg in order to strengthen it particularly against compression in the direction of the axis of the opening 88. The corresponding post 80 is provided with two openings 92 extending transversely therethrough, the upper of which is adapted to be aligned with the opening 88 in the corresponding leg 82 when the latter is in its inoperative position, and the other of which is adapted to be aligned with the opening 88 in the corresponding leg 82 when the leg 82 is in its operative position. A headed pin 94 is provided for each post 80 and is adapted to project through the openings 92 therein and through the opening 88 in the corresponding leg 82 to lock the leg 82 in either its raised or its lowered position with respect to its corresponding post 80. As best illustrated in Fig. 7 the end of each pin 94 opposite the head thereof is preferably bifurcated and a cross-bar 96 is pivotally mounted within such bifurcated end, the cross-bar 96 being of such dimensions that when swung in parallel relation with respect to the axis of the pin it lies within the extended circumferential area thereof and when swung to bring its length transverse to the length of the pin projects outwardly beyond the opposite sides thereof. Further, a compression spring 98 is provided around the pin 94 between the head thereof and the opposed face of the post 80. It will be appreciated that in operation after the hole 88 in a leg 82 is aligned with the desired hole 92 in the corresponding post 80 the pin 94 with the cross-bar 96 aligned therewith as illustrated in dotted lines in Fig. 7 is projected through the aligned holes or openings and pressure is applied on the head of the pin 94 to compress the spring 98 which projects the cross-bar 96 sufficiently beyond the opposite face of the post 80 to permit the cross-bar 96 to be swung to the position illustrated in full lines in Fig. 7, upon which the pressure on the pin 94 is released and the spring 98 draws the cross-bar 96 into contact with the adjacent face of the post 80 and prevents it from inadvertently returning to its withdrawable position. By this means the front legs 82 may be quickly positioned in either their operative or inoperative position and, being positioned forwardly of the front axle 20 at all times, may be positioned in their operative position prior to removing the bolts 62 which secure the auxiliary power plant in the main frame of the vehicle.

As in the case of my co-pending application above identified the power plant unit is provided with a pivoted leg structure at its inner end but in this case it is of an improved construction and may be raised and lowered from the outer end of the power plant unit, with all of the attendant advantages. As best indicated in Figs. 4 and 5, the side frame members 40 of the auxiliary frame structure adjacent the rear end thereof are each provided with a downwardly extending bracket 100 rigidly fixed thereto as by welding or the like. Between the bottom ends of the brackets 100 a cross-shaft 102 is extended and rigidly fixed thereto. Four arms or leg members 104 are rotatably mounted on the cross-shaft 102 at one end thereof and they are spaced from each other axially of the cross-shaft 102. The free ends of all of the leg members 104 are rigidly connected together in line by means of a tube 106. The outer leg members 104 are slightly longer than the center leg members 104 and are provided at their outer ends with casters 108 for contact with the floor or other supporting surface when the power plant unit is removed from the vehicle. This leg structure is adapted to be swung up into a substantially horizontal plane when the power plant unit is in operative position in a vehicle, as illustrated in Figs. 4 and 5, and swung downwardly to an approximately vertical plane as illustrated in Fig. 2 when the power plant unit is removed from a vehicle. The mechanism for moving it between its operative and inoperative positions will now be described.

In the particular vehicle construction shown by way of illustration the power plant unit is illustrated as being provided with a power plant comprising two engines 110 supported in side by side and spaced relation upon the auxiliary frame.

In order to support the engines 110 a pair of cross-members 112 are extended between opposite frame side members 40 of the auxiliary frame and in spaced relation with respect to each other longitudinally of the auxiliary frame. These cross-members 112 are connected together midway between their ends by a longitudinally extending auxiliary frame member 114, preferably of rectangular section and of tubular construction. As illustrated in Fig. 5 its forward end is secured to the forward cross-member 112 in substantially the same horizontal plane therewith and in extending rearwardly it curves downwardly and below the rear cross-member 112 to which it is suitably secured and then continues on rearwardly and upwardly to the rear cross-member 42 to which it is also rigidly secured. The engines 110 are suitably mounted upon the cross-members 112. Midway between the cross-members 112 a block 116 is suitably secured to the upper face of the member 114 and rotatably supports therein the lower end of an upwardly inclined and forwardly extending screw 118 which is positioned between the engines 110. At its outer end the screw 118 is rotatably supported in a block 120 secured to the vertically directed side flanges 121 fixed to the adjacent sides of the radiators 122 for the engines 110. The radiators 122 are carried by a cross-bar 124 extending between the opposite side members 40 of the auxiliary frame and suitably fixed thereto. The radiators 122 thus form a part of the power plant unit. Outwardly beyond the member 120 the screw 118 is bent to form a handle 126 by means of which the screw 118 may be manually rotated by a workman at the outer end of the power plant unit.

The screw 118 is provided with a nut 130 threaded thereon for movement longitudinally thereof upon rotation of the screw. The nut 130 is of rectangular cross-sectional configuration and of a width substantially equal to or very slightly wider than the width of the frame member 114. On each side it is provided with an outwardly projecting trunnion 132, the trunnions 132 being aligned with each other. A plate member 134 is received over each trunnion 132 and secured in flat contacting relationship with respect to the corresponding side of the nut 130. The plates 134 project downwardly below the nut 130 so that when the nut 130 is in its lowered position they fit over the opposite sides of the cross-member 114 in relatively close relationship with respect to the latter to brace the nut 130 and the forward ends of the links to be hereinafter described against lateral movement and against rattling. Furthermore, when in such position the nut 130 is preferably screwed tightly into contact with the block 116 to further aid in rigidifying the construction and eliminating the possibility of rattling.

Pivotally received upon each of the trunnions 132 outside of the corresponding plate 134 is one end of a link 136 which is inclined outwardly from the nut 130 and its opposite end is rotatably received by the cross-bar 106 on the corresponding side of the unit and outwardly of the innermost leg 104 on such side as best brought out in Fig. 4. Any suitable means may be provided for preventing the upper ends of the links 136 from becoming disengaged from the corresponding trunnions 132 as, for instance, pins projected through holes provided to receive them in the trunnions.

With the construction above described it will be appreciated that when the handle 126 is turned to rotate the screw 118 in a direction to move the nut 130 upwardly on the screw, the nut 130 in moving upwardly will act through the links 136 to rotate the various leg members 104 in a clockwise direction of rotation, as viewed in Fig. 5, so as to move them to their horizontal inoperative position. There is sufficient inherent friction between the screw 118 and the nut 130 to hold the rear leg structure in such elevated or inoperative position without danger of it inadvertently working back towards its operative position in service. When this leg structure is in the raised or inoperative position illustrated in Fig. 5 it is positioned sufficiently high above the supporting surface for the vehicle to permit the auxiliary frame to be drawn outwardly of the vehicle frame and to pass over the vehicle front axle 20 without interference. After the power plant unit has been withdrawn from the vehicle frame side members 11 a sufficient distance to bring the cross-bar 102 outwardly beyond the front axle 20, then the handle 126 may be operated to move the nut 130 from the position illustrated in Fig. 5, for instance, downwardly on the screw 118 until the plates 134 bridge opposite sides of the auxiliary frame member 114. The nut 130 is preferably forced against the block 116 at the end of this operation at which time the leg structure will have swung in a counter-clockwise direction of rotation about the cross-rod 102 as viewed in Fig. 5 and will have moved into its supporting and substantially vertical position illustrated in Fig. 2, whereupon the power plant unit may be then fully withdrawn from the vehicle frame and the power plant unit will then be supported in a desired relation with respect to the floor independently of the vehicle.

It is, of course, desirable in all motor vehicle constructions to provide a so-called mud pan structure under the power plant to prevent mud, water and other foreign material from being splashed by the tires of the vehicle onto the engine and parts thereof. Where pivoted legs such as above described are provided on such a power plant unit the provision of a mud pan is complicated and as far as I am aware prior structures required removal of at least a portion of the mud pan before the pivoted supporting leg could be lowered. This difficulty is obviated in accordance with the present invention in the following manner.

Referring now to Fig. 5, a mud pan forward section 140 is rigidly but preferably removably secured to and between the auxiliary frame side members 40 from a position adjacent the forward ends thereof to a line slightly forward of the position of the casters 108 when in their raised position illustrated in Fig. 5. The pivoted rear leg structure may, therefore, be raised and lowered without interference with the mud pan section 140. In order to provide a continuation of the mud pan structure over the area of the rear leg structure, a sheet metal mud pan section 142 is rigidly fixed to the rear leg structure and extends from a point adjacent the cross-bar 102 to a point short of the outer surfaces of the casters 108. Thus the mud pan section 142 constitutes a part of the rear leg structure and is pivotable from a raised position of the leg structure in which it cooperates with the mud pan section 140 to complete the entire mud pan structure for the auxiliary power plant unit, to a vertical position such as illustrated in Fig. 2 when the rear supporting leg structure is lowered and at which time there is no active utility in the mud pan. Additionally, the mud pan section 142 serves to reinforce the pivoted rear leg structure against distortion under load.

In vehicles of the type described there are, of course, a number of tubes, wires, rods or the like which are necessary to employ in connecting parts carried by the power plant unit with parts carried by the vehicle frame. For instance, each engine must be connected to its corresponding rear axle by a power shaft which must be disconnected from the engine in order to remove the power plant. The gasoline tank is usually carried by the vehicle frame and, accordingly, the gasoline line leading to the engine or engines must be disconnected to remove the power plant. Likewise the electrical instruments carried by the instrument panel of the vehicle and connected to the engine must be disconnected in removing the power plant. The accelerator pedal is usually carried by the cab of the vehicle and its connection to the carburetor must be disconnected in removing the power plant. The brakes may be entirely supported by the vehicle frame and consequently do not need to be disconnected in removing the power plant unit. In view of the fact that the clutch operating pedal is carried by the vehicle frame particularly where such vehicles are of the "cab over the engine" type shown, it has heretofore been necessary to disconnect the clutch operating pedal from the clutch in removing the power plant unit. However, in accordance with a further phase of the present invention it becomes unnecessary to manually unfasten any coupling or connection between the clutch operating pedal and the power plant unit as this is accomplished automatically as follows.

As best illustrated in Figs. 2, 4 and 5 the clutch throw out shaft (not shown) of each engine 110 and with which every automotive vehicle is provided, is in this case provided with a rearwardly extending clutch throw out arm 150, such arms 150 in the particular case shown being secured to the inside ends of the clutch throw out shafts for both the engines 110. The free ends of both the arms 150 are connected by an adjustable connection, shown in Fig. 5 as a turnbuckle structure 152, with the free end of a corresponding pair of arms 154 both of which are fixed to a transversely extending rock shaft 156 supported at its opposite ends by brackets 158 mounted on the upper faces of the auxiliary frame side members 40. As best brought out in Fig. 6, outwardly beyond the lefthand bracket 158 the rock shaft 156 has fixed thereto an upwardly and normally rearwardly extending lever arm 160. As best brought out in Fig. 6 a bracket 162 is fixed to the upper face of the lefthand frame side member 11 immediately to the rear of the corresponding bracket 158 when the power plant is in its operative position and the bracket 162 rotatably supports an arm or lever 164 which also normally extends upwardly and to the rear therefrom. The levers 160 and 164 are arranged in the same plane longitudinally of the vehicle so that their paths of movement are intersecting with respect to each other, but the lever 164 preferably projects upwardly above the upper end of the lever 160. The free end of the lever 164 is connected by a rod or link 166 as best shown in Fig. 3, to an arm 168 secured to a short cross-shaft 170 rotatably mounted in a bracket 172 fixed to the upper face of the lefthand frame side member 11 adjacent the forward end thereof. The clutch pedal 174 is fixed to the opposite end of the shaft 170 so that when the clutch pedal 174 is depressed it acts through the shaft 170 to move the upper end of the arm 168 forwardly and, acting through the rod 166, acts to move the upper end of the arm or lever 164 forwardly. A coil spring 176 extended between the lever 164 and the corresponding frame side member 11 normally maintains the clutch pedal 174 in its retracted position.

As will be appreciated from the above description, when the clutch pedal 174 is depressed it moves the free end of the lever 164 forwardly and through engagement with the lever 160 moves the upper end of the latter forwardly thereby to move the engine clutches to disengaged position. In order to provide an adjustment at this point independently of the turnbuckle structures 152 which are primarily provided for adjusting clutches of both engines into unison with each other, the lever 164 is provided with a screw 178 threaded therethrough in a direction perpendicular to its length and in a position so that its head may engage the outer end portion of the arm or lever 160 in order to transmit the turning force from the lever 164 to the lever 160. The screw 178 may thus be threaded inwardly or outwardly in order to adjust the relative positions of the levers 160 and 164 and may be locked in its adjusted position by means of a lock nut 180. With this construction it will be appreciated that the lever 160 being a part of the power plant unit and the lever 164 being a part of the vehicle itself, when the power plant unit is withdrawn from the frame of the vehicle the levers 160 and 164 are automatically disconnected from each other, and that when the power plant unit is returned to the frame the levers 160 and 164 are automatically brought into their proper operative relationship with respect to each other. Thus this structure eliminates the need of manually disconnecting any parts extending between the clutch pedal and the clutches themselves in either applying or removing the power plant units to or from the vehicle.

Having thus described my invention, what I claim by Letters Patent is:

1. In a motor vehicle, in combination, a main frame, an auxiliary frame slidable longitudinally of said main frame into and out of operative relation with respect thereto, a supporting leg structure pivotally secured to said auxiliary frame adjacent the inner end thereof and swingable between an approximately horizontal inoperative position to an approximately vertical operative position, a screw rotatably mounted on said auxiliary frame, a nut threaded on said screw, and link means interconnecting said nut and said leg structure for simultaneous movement.

2. In a motor vehicle, in combination, a main frame, an auxiliary frame slidable longitudinally of said main frame into and out of operative relation with respect thereto, a supporting leg structure pivotally secured to said auxiliary frame adjacent the inner end thereof and swingable between an approximately horizontal inoperative position to an approximately vertical operative position, a longitudinally extending screw rotatably mounted on said auxiliary frame, means for rotating said screws from a point adjacent the outer end of said auxiliary frame, a nut threaded on said screw, and link means interconnecting said nut with said leg structure at a point offset from the axis of rotation of the latter.

3. In a motor vehicle, in combination, a main frame, an auxiliary frame slidable longitudinally of said main frame into and out of operative relation with respect thereto, a supporting leg structure pivotally secured to said auxiliary frame adjacent the inner end thereof for movement from an approximately vertical operative position to an approximately horizontal inoperative position, a longitudinally extending frame member in said auxiliary frame, a longitudinally extending screw rotatably supported at one end on said frame member, a nut threaded on said screw, link means interconnecting said nut and said leg structure for simultaneous movement, and means carried by said nut adapted to embrace said frame member when said leg structure is in its operative position thereby to aid in bracing said leg structure with respect to said auxiliary frame.

4. In a motor vehicle, in combination, a main frame, an auxiliary frame slidable longitudinally of said main frame into and out of operatve relation with respect thereto, a supporting leg structure pivotally secured to said auxiliary frame adjacent the inner end thereof for movement from an approximately vertical operative position to an approximately horizontal inoperative position, a longitudinally extending frame member in said auxiliary frame, a pair of radiators supported on said auxiliary frame adjacent the outer end thereof, a screw rotatably supported at one end on said frame member on one side of said radiators and projecting therefrom between and beyond said radiators, a nut threaded on said screw, and link means interconnecting said nut and leg structure for simultaneous movement.

5. In a motor vehicle of the class including a main frame and a power plant unit including an auxiliary frame slidably associated with said main frame for movement into and out of operative relation with respect thereto, the combination with said auxiliary frame of a supporting leg structure pivotally secured thereto for movement between an approximately vertical operative position and an approximately horizontal inoperative position, a mud pan structure at the under-side of said power plant unit secured against movement with respect thereto, and a second mud pan structure secured to said leg structure and movable therewith from an operative position when said leg structure is in inoperative position to an inoperative position when said leg structure is in operative position.

6. In a motor vehicle of the class including a main frame and a power plant unit including an auxiliary frame slidably associated with said main frame for movement into and out of operative relation with respect thereto, the combination with said auxiliary frame of a supporting leg structure pivotally secured thereto for movement between an approximately vertical operative position and an approximately horizontal inoperative position, a mud pan structure at the under-side of said power plant unit secured against movement with respect thereto, and a second mud pan structure forming a continuation of the first-mentioned mud pan structure when said leg structure is in inoperative position secured to said leg structure, and movable therewith from an operative position when said leg structure is in inoperative position to an inoperative position when said leg structure is in operative position.

RAY F. THORNTON.